O. LOVE.
Post-Hole Borer.
No. 166,392.
Patented Aug. 3, 1875.
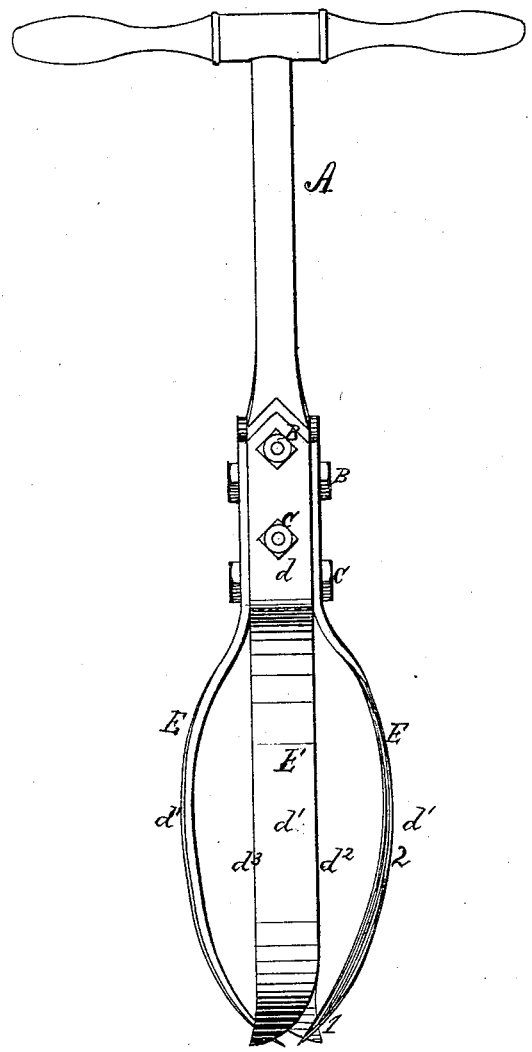
WITNESSES:
A. B. Robertson
Solon C. Kemon
INVENTOR:
Obadiah Love
BY
ATTORNEYS.

UNITED STATES PATENT OFFICE.

OBADIAH LOVE, OF SAXENBURG, PENNSYLVANIA.

IMPROVEMENT IN POST-HOLE BORERS.

Specification forming part of Letters Patent No. 166,392, dated August 3, 1875; application filed June 28, 1875.

*To all whom it may concern:*

Be it known that I, OBADIAH LOVE, of Saxnburg, in the county of Butler and State of Pennsylvania, have invented a new and Improved Post-Hole Borer; and I do hereby declare that the following is a full, clear, and exact description of the same, reference being had to the accompanying drawing, forming a part of this specification, in which the figure is a side elevation.

This invention relates to devices employed to expedite and lessen the cost of digging post and other ground holes.

It will first be described in connection with drawing, and then pointed out in the claim.

A represents a T-shaped handle, to each side of whose squared lower end $a$ I secure, by nut and screw-bolt B C, the shank $d$ of a blade, preferably made of steel. Each of these blades is made in the form of a bow, $d^1$, and preferably curved on the rear blunt edge $d^2$, while the front edge $d^3$, extending from point marked 1 to that of greatest convexity, marked 2 on the drawing, is sharp, so as to cut the earth and leave a smooth surface on the sides of hole. The four blades E, being thus grouped together, make a cage that receives and holds the soil, while the cutting-edge of each is about at right angles to that of the adjacent blades.

The operation is as follows: When the implement is held perpendicularly and the handle A rotated by the operator, the points 1 co-operate to perforate a central hole, which is then gradually enlarged by the diverging blades until the greatest diameter of borer at 2 has been reached. The soil that is thus excavated is carried directly into the cage formed by the blades, because the edge of each blade is outwardly inclined, and the heel thrown somewhat inward. From the point 2 the tool is made to converge toward the upper end, so as to enable the borer to go deeper into earth than it is necessary to cut. The borer having been withdrawn and tapped against the ground, the dirt, which has acquired consistency enough to hold together in the cage, disintegrates and readily falls out.

Having thus described my invention, what I claim as new is—

The combination, in a post-hole borer, of a series of convergingly-curved blades, E $d^1$ $d^2$, having their front edges sharpened and inclined outwardly with the T-shaped handle, as and for the purpose specified.

OBADIAH LOVE.

Witnesses:
SOLON C. KEMON,
CHAS. A. PETTIT.